Patented Apr. 10, 1951

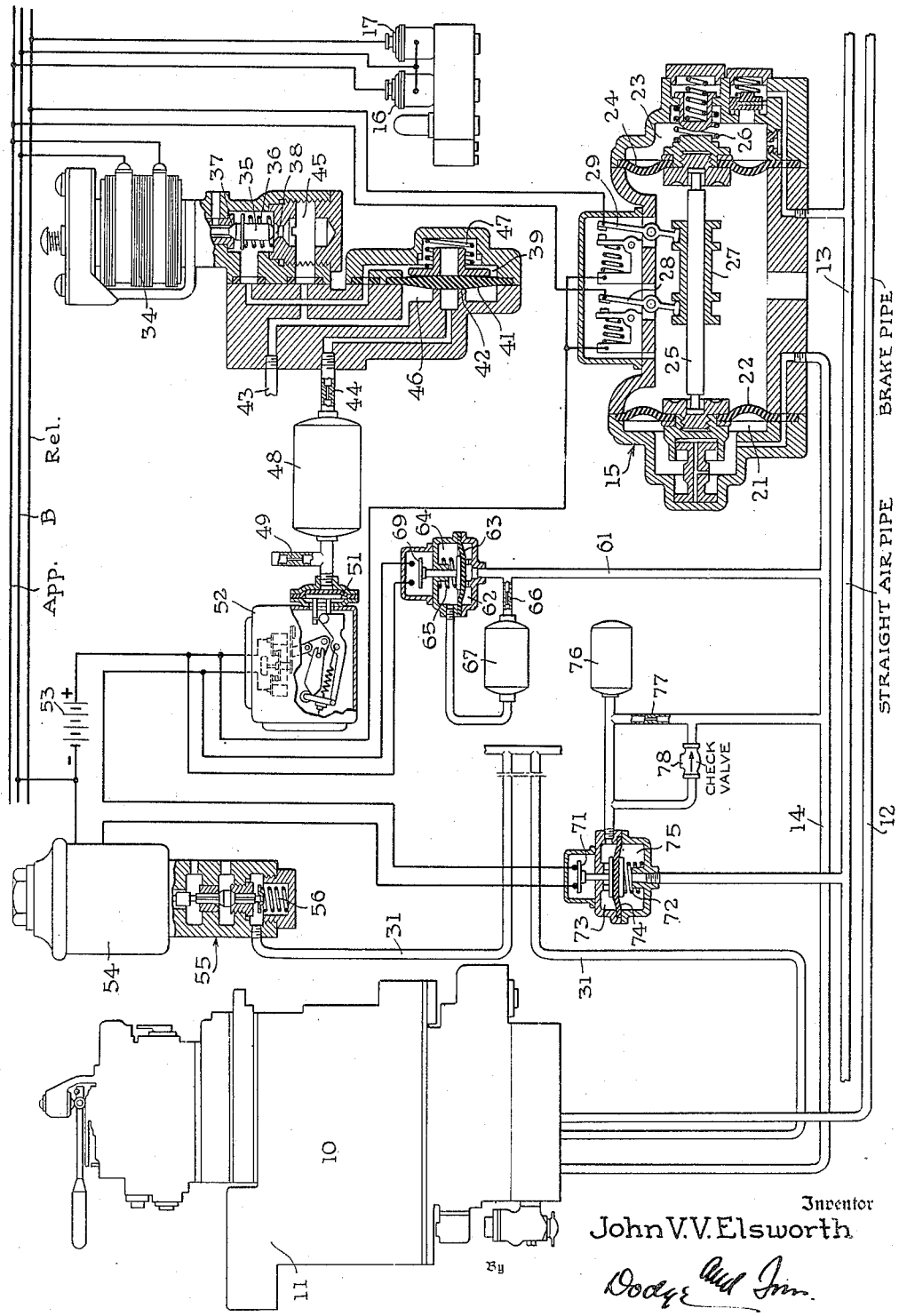

2,548,005

UNITED STATES PATENT OFFICE 2,548,005

LAG-RESPONSIVE PROTECTION DEVICE

John Van Varick Elsworth, Watertown, N. Y., assignor to The New York Air Brake Company, a corporation of New Jersey Application July 1, 1949, Serial No. 102,615

2 Claims. (Cl. 303—26)

This invention relates to air brakes and particularly to safety systems for electro-pneumatic brakes. As a basis for disclosing the principle of the invention it will be described as applied to the 24–RL brake which is a commercial standard familiar to persons skilled in the art.

Basically this is a dual brake system, in which a complete automatic brake system and a complete electro-pneumatic straight-air system exist side by side throughout the train. They operate the same brake cylinders through the same relays. They are controlled by the same engineer's brake valve, which may be set to operate the straight-air system or the automatic system simply by shifting a two-position selector.

A few characteristics are of present importance, and will be mentioned. The automatic brake pipe retains all its usual characteristics. Hence, a break-in-two will inevitably cause an emergency application. This major safety factor is always present. Moreover, no matter how the selector is set, the engineer's brake valve always has one and the same emergency position, which will produce an automatic emergency application. Hence, the second major safety factor, characteristic of automatic operation, is always available, and available in the position used since the adoption of the equalizing discharge valve. Both major safety characteristics of automatic braking being always present, and in no way dependent on any electrical function or straight-air function, the system loses nothing by the presence of the electro-pneumatic straight-air system.

There are, however, psychological possibilities which it is desirable to take into account, to meet and guard against human failure. The straight-air pipe is divided into car length units by chokes, though it is connected continuously throughout the train. The pressure in each unit is controlled by an electrically actuated inlet valve and and electrically actuated discharge valve. All such units are controlled by a master controller located at the head of the train. Since it is impracticable to operate the electrical part of the system on a closed circuit basis, the electrical part of the system cannot have a "fail safe" characteristic, and since the car-lengths of the straight-air pipe are semi-isolated, units comprising more than one car, cannot be properly controlled by adjacent cars, in the event of failure of some electrically operated valve.

Trains equipped with the 24–RL brake are operated on the straight-air principle under normal conditions. The engineer's brake valve is set to establish a desired pressure in the control pipe. This pressure puts the master controller into action, and the latter through electrically actuated application and release valves establishes a related pressure in the straight-air pipe. The pressure so established exercises a follow-up or neutralizing effect on the master controller, so that establishment of the desired straight-air pipe pressure puts the master controller in balance, whereupon its action ceases.

In another application, Ser. No. 100,928, filed June 23, 1949, which issued October 31, 1950, as Patent No. 2,527,920, I have described and claimed a safety device which becomes active upon abnormal functioning of the master controller. If release magnet valves fail to close or application magnet valves do not open or if the straight-air pipe is broken or leaks, the master controller will "cycle," i. e. operate repeatedly in its automatic effort to establish straight-air pipe pressure. According to that invention cycling of the master controller, if it occurs to an extent indicating serious derangement, will cause a service application of the brakes on the automatic principle.

The present invention serves to produce a similar application if, when control pipe pressure rises, straight-air pipe pressure (at or near the master controller) lags unduly behind control pipe pressure.

This scheme can be used independently of the one in the prior application but since its functions are to an extent complementary, and since it can operate through or by the aid of components used in the other scheme, it will be here described as incorporated with the other scheme.

Only so much of the 24–RL brake equipment as is necessary to a disclosure will be here described. A complete understanding of the system can be had from The New York Air Brake Company's Instruction Pamphlet No. 59 dated May 1948, a copy of which is of record in the file of my prior application, above identified.

A preferred embodiment of the invention will now be described by reference to the accompanying drawing in which the single figure is a diagram, partly sectional showing the safety devices of my prior application and of the present invention each associated with a 24–RL brake system through a single electrically operated valve forming a part of both safety devices.

The brake system and the safety device of my prior application will first be described. The engineer's brake valve is indicated in elevation at 10 and, as is well known, includes a service application valve in the housing 11. The function of this valve is to produce under certain conditions a full service application through the automatic side of the system. The engineer's brake valve is convertible for operation selectively on the straight-air principle and the automatic principle, and when set for operation on the automatic principle operates the brakes by controlling the pressure in the normally charged brake pipe 12. When set to operate on the electro-pneumatic straight-air principle, the engineer's brake valve 10 controls the pressure in the straight-air pipe 13. It does so indirectly by controlling the pressure in a control pipe 14 sometimes called the "number eleven" pipe because that happens to be the identifying number cast on the pipe bracket of the engineer's brake valve.

The pressure in pipe 14 controls the operation of a master controller 15 which, in the example illustrated, is an electric switch controlling application and release magnet valves which in turn exercise control on the pressure in the straight-air pipe. These magnet valves are located at intervals throughout the train. One such application magnet valve is shown at 16 and the related release magnet valve at 17.

The primary function of the valves 16 and 17 is to establish and dissipate pressure throughout the length of the straight-air pipe 13. In accomplishing this function they may operate in any of the ways known in the art and since their function is familiar, this detail is not illustrated.

The magnet valves are controlled by the controller 15 through a three-wire circuit which extends throughout the train and comprises the B wire designated by the letter B, the application wire designated by the legend App. and the release wire designated by the legend Rel.

The pipe 14 leads to a chamber 21 at the left of an actuating diaphragm 22. The straight-air pipe leads to a chamber 23 at the right of a neutralizing or follow-up diaphragm 24. The centers of the diaphragms are connected together by a rod 25 whose motion actuates switches hereinafter mentioned. If pressure in pipe 14 is raised, diaphragm 22 moves to the right against the resistance of a biasing spring 26. If pressure is immediately developed in the straight-air pipe 13 (as should be the case), pressure in chamber 23 balances that in 21 and the spring 26 moves the rod 25 and the diaphragms in the reverse direction.

After pressure has been established in the straight-air pipe, lowering of the pressure in the pipe 14 and consequently in chamber 21 will cause a further reverse movement of the diaphragms.

Rod 25 carries a collar 27 which actuates the application switch arm 28 and the release switch arm 29 simultaneously both in circuit closing directions. The coacting contacts are so contrived that the effect is first to energize and close the release magnet valve 17 and thereafter energize and open the application magnet valve 16. That, of course, is what produces the rise of pressure in the straight-air pipe 13. Under "lap" conditions the release magnet valve remains energized but the application magnet valve is de-energized.

It is apparent from what has just been said that if an engineer attempts to make an application, and there is a break in the straight-air pipe or a serious leak therefrom, or if release magnet valves fail to function or application magnet valves fail to function, there will be a disturbance of the operation of the master controller 15. Malfunctions short of complete circuit failure (against which other safeguards are interposed), cause the master controller 15 to cycle that is, cause it to reciprocate or operate recurrently. The invention makes use of this recurrent operation or cycling to operate the service application valve in housing 11 and thereby produce an automatic service application.

Operation of the service application valve is effectuated by venting a pipe 31 known in the industry as the "number ten pipe." So far as here material, the venting of the pipe 31 produces an automatic service application. The term "automatic" is here used in the technical sense to mean a brake application produced by the automatic side of the system.

A winding 34 is connected between the line B and the application line so that every time the master controller 15 functions, the winding 34 is energized. The armature in the winding 34 operates a double beat poppet valve 35, which is biased by a coil compression spring 36 toward an exhaust seat 37 and away from an inlet seat 38. The valve 35 controls the pressure in the chamber 39 behind a combined flexible diaphragm and valve 41.

The valve seats against an annular seat 42 and controls flow from a main reservoir connection 43 to a choke 44. Main reservoir pressure from the connection 43 is always present in the space 45 beneath the inlet seat 38 and is also present in the annular space 46 to the left of the diaphragm 41. The diaphragm 41 is biased toward its seat by a coil compression spring 47.

Thus, when winding 34 is de-energized, diaphragm valve 41 closes but each time that winding 34 is energized the valve 41 opens. It stays open as long as the winding 34 is energized. It then supplies air to the choke 44, and this air is admitted to a small reservoir or accumulator volume 48 which is constantly vented to atmosphere through a choke 49. The sizes of the chokes 44 and 49 are so coordinated that the choke 49 will substantially dissipate pressure in the volume 48 except in cases where winding 34 is energized with a frequency high enough to indicate derangement of the system. Pressure so developed in the volume 48 reacts on the motor diaphragm 51 of the normally closed pressure switch generally indicated by the numeral 52.

The source of current for the lines App., B and Rel. is typified by the battery 53 and the switch 52 is arranged to control a circuit from this battery through the winding 54 of a magnet valve generally indicated at 55. The valve 55 is biased to open by a coil compression spring 56 and when opened vents the pipe 31. It follows that the winding 54 is constantly energized and holds the valve 55 closed, and that maintained closure is dependent on integrity of the circuit. The switch 52 is normally closed but will be opened if the reservoir 48 is charged. Thus, excessive cycling of the master controller 15 causes charging of the reservoir 48 and an excessive charging rate opens the switch 52, causes the valve 55 to open and thus vents the pipe 31.

Venting of the pipe 31 produces an automatic service application which is beyond the control of the engineer and which warns him that the electro-pneumatic system is seriously deranged. If he cannot discover and correct the defect, all he has to do is to convert his engineer's brake valve 10 to automatic operation and proceed on the automatic principle.

While the mechanism above described will normally respond only to cycling of the master controller 15, a safeguard is provided against its operation in the event that the engineer initially makes a full service application which is sustained for a considerable time so that the master controller 15 will remain in application position for a longer period than is ordinarily the case. To prevent the safety mechanism from responding to this type of manipulation, a connection 61 leads to the lower chamber 62 of a differential diaphragm mechanism which includes a flexible diaphragm 63 and above the diaphragm a secondary chamber 64. The diaphragm is biased downward by a spring 65. A choke connection 66 leads from the branch line 61 to a small volume reservoir 67 and this reservoir in turn is in free communication with the chamber 64.

From the construction just described it follows that when pipe 14 is initially put under pressure, the diaphragm 63 moves upward and remains upward for a brief period until the volume reservoir 67 and the chamber 64 are charged, whereupon the spring 65 restores the diaphragm to its lower position. When the diaphragm is in its upper position it closes an electric switch 69 which is connected across the terminals of the switch 52. In this way the switch 52 is prevented for a brief time interval from interrupting the circuit through the winding 54. As a consequence there is a brief period at the start of an application in which the switch 52 is prevented from breaking the circuit through the winding 54 and causing a service application. However, this is merely a temporary suspension of the function of the switch 52 effective at the commencement of an application.

No novelty is here claimed for any of the foregoing, since it is subject matter claimed in my prior application.

The present invention provides independent means to interrupt the circuit through winding 54, and so cause an automatic service application in case of a derangement which need not cause cycling of master controller 15.

Assume that pressure is established in control pipe 14 and that the desired related pressure in the straight-air pipe 13 develops slowly or not at all. This could occur as a result of conditions which would not cause master controller 15 to cycle. Hence, a second means to cause a brake application in response to this type of malfunction is desirable.

A switch 71, biased to close by spring 72 is interposed in the circuit through winding 54, and may be opened when pressure in chamber 73, above diaphragm 74, materially exceeds pressure in chamber 75 below said diaphragm.

Chamber 75 is in free communication with straight-air pipe 13. The effective volume of chamber 73 is increased by a connected chamber 76 and the two are in restricted communication with control pipe 14 through choke 77. A check valve 78 opens a by-pass around choke 77 when flow is toward control pipe 14.

From the above construction it follows that rising pressure in control pipe 14 becomes effective in chamber 73 after a brief time lag. If pressure in straight-air pipe 13 lags behind the delayed pressure in chamber 73, switch 71 will open and de-energize winding 54. This causes valve 55 to vent pipe 31 and a service application results.

The application so made cannot be released unless the engineer either corrects the cause of the malfunction or converts his brake valve 10 to operation on the automatic principle.

While the invention is complementary to that of the prior application, it can be used independently thereof (i. e. in a system which does not include the subject matter of the prior application).

Obviously the differential pressure diaphragm 74 with its delay mechanism 76, 77, 78 can be variously embodied and can actuate a brake applying mechanism different from that here described.

I claim:

1. In an electro-pneumatic brake system the combination of a control pipe; means for establishing pressures therein; a normally vented straight-air pipe for controlling application and release of brakes; electrically actuated application and release valves operable to regulate pressure in the straight-air pipe; a pneumatically actuated master controller connected to control said electrically actuated valves, and arranged to be shifted in application direction by pressure established in said control pipe and in the opposite direction by pressure in the straight-air pipe; automatic brake applying means arranged to operate independently of said straight-air pipe; an electrically controlled device serving when de-energized to cause said brake applying means to operate; a source of electric current; a switch biased to close; a circuit including said device, said source and said switch; a differential pressure motor subject to straight-air pipe pressure acting in a switch-closing direction and to control pipe pressure acting in a switch-opening direction; and selective means for delaying the development of rising control pipe pressure on said differential pressure motor.

2. The combination with the structure defined in claim 1, of a second normally closed switch in said circuit in series with the first switch; and means responsive to cycling of said master controller for opening said second switch.

JOHN VAN VARICK ELSWORTH.

REFERENCES CITED

The following references are of record in the file of this patent:

UNITED STATES PATENTS

| Number | Name | Date |
| --- | --- | --- |
| 2,121,543 | Hewitt | June 21, 1938 |